(12) United States Patent
Perdriset

(10) Patent No.: US 8,978,714 B2
(45) Date of Patent: Mar. 17, 2015

(54) METHOD AND DEVICE FOR MANUFACTURING A BI-MATERIAL SLEEVE AND SLEEVE THUS PRODUCED

(75) Inventor: Frederic Perdriset, Tressange (FR)

(73) Assignee: Areva NP, Courbevoie (FR)

( * ) Notice: Subject to any disclaimer, the term of this patent is extended or adjusted under 35 U.S.C. 154(b) by 321 days.

(21) Appl. No.: 13/638,783

(22) PCT Filed: Apr. 1, 2011

(86) PCT No.: PCT/FR2011/050736
§ 371 (c)(1),
(2), (4) Date: Dec. 17, 2012

(87) PCT Pub. No.: WO2011/121251
PCT Pub. Date: Oct. 6, 2011

(65) Prior Publication Data
US 2013/0087242 A1    Apr. 11, 2013

(30) Foreign Application Priority Data
Apr. 2, 2010  (FR) ..................................... 10 52508

(51) Int. Cl.
*F16L 9/02*  (2006.01)
*B22D 7/02*  (2006.01)
*B22D 19/16*  (2006.01)
(Continued)

(52) U.S. Cl.
CPC ... *F16L 9/02* (2013.01); *B22D 7/02* (2013.01); *B22D 19/16* (2013.01); *B22D 25/02* (2013.01); *B22D 31/002* (2013.01)
USPC ............................................ 138/143; 164/95

(58) Field of Classification Search
CPC ...... B22D 19/16; B22D 25/02; B22D 31/002; F16L 9/02
USPC ......................... 138/147, 153, 172, 177, 178; 164/93–96, 69.1, 125–128, 443, 348; 29/527.6
See application file for complete search history.

(56) References Cited

U.S. PATENT DOCUMENTS 2,025,336 A * 12/1935 Brearley ....................... 164/59.1
3,780,418 A * 12/1973 Hurst .............................. 419/42
(Continued)

FOREIGN PATENT DOCUMENTS

DE    15 83 653 A1    8/1970
FR     738 849 A     12/1932
(Continued)

*Primary Examiner* — Lien Ngo
(74) *Attorney, Agent, or Firm* — Davidson, Davidson & Kappel, LLC

(57) ABSTRACT

A method for manufacturing a bi-material sleeve is provided. The sleeve includes an annular outer sleeve and an annular inner sleeve bonded to each other. The bottom pouring of the outer sleeve is carried out in a casting space delimited by a wall of a first ingot mold and by an outer upwardly moveable wall of a second ingot mold concentric with the first. The moveable wall of the second ingot mold is raised so as to uncover the skin of the outer sleeve which has solidified thereagainst. The bottom pouring and the solidification of the inner sleeve are carried out in a casting space delimited by said skin and an inner stationary wall of said second ingot mold, the bonding of both sleeves being effected by diffusion between said sleeves. Forging and/or machining of one of said bonded sleeves are optionally carried out. A device for using this method and a sleeve produced by this method are also provided.

23 Claims, 3 Drawing Sheets

(51) Int. Cl.
  *B22D 25/02* (2006.01)
  *B22D 31/00* (2006.01)

(56) References Cited

U.S. PATENT DOCUMENTS

| | | | | |
|---|---|---|---|---|
| 4,278,124 A | * | 7/1981 | Aso et al. | 164/125 |
| 4,615,373 A | * | 10/1986 | Saito et al. | 164/125 |
| 4,693,293 A | * | 9/1987 | Yamamoto et al. | 164/99 |
| 4,759,399 A | * | 7/1988 | Saito et al. | 164/126 |
| 5,056,209 A | * | 10/1991 | Ohashi et al. | 29/517 |
| 6,203,752 B1 | * | 3/2001 | Bewlay et al. | 419/6 |
| 7,537,725 B2 | * | 5/2009 | Groh et al. | 419/6 |
| 8,074,704 B2 | * | 12/2011 | Blackburn et al. | 164/464 |

FOREIGN PATENT DOCUMENTS

| | | |
|---|---|---|
| GB | 410 121 A | 5/1934 |
| JP | 2007 313551 A | 12/2007 |
| SU | 276111 | 7/1970 |
| SU | 1445851 | 12/1988 |
| SU | 1470430 | 4/1989 |

\* cited by examiner

METHOD AND DEVICE FOR MANUFACTURING A BI-MATERIAL SLEEVE AND SLEEVE THUS PRODUCED

The invention relates to the field of metallurgy, and more particularly to the manufacturing of bi-material sleeves, i.e. parts formed with two concentric mutually interdependent portions with ring shapes made in two different materials and secured to each other.

BACKGROUND

The industry related to the use of reactors subject to pressure—including the nuclear and petrochemical industry—uses such sleeves as constituents of reactor vessels or pressurizers. These sleeves may be manufactured by bonding two initially separate sleeves each made by any method, or a sleeve and a strip to be arranged on a surface of the sleeve. The outer sleeve may for example be in low carbon steel of the 16MND5 type and the inner sleeve may be in austenitic stainless steel of the 304L type initially as a strip.

The outer carbon steel sleeve may be obtained by forging, and the internal stainless steel sleeve may, as this was said, be formed by a strip which is bonded on the inner surface of the outer sleeve. In a non-limiting way, the inner diameter of the internal sleeve may be comprised between 2 and 9 meters, its height may be comprised between 2 and 5 meters, the thicknesses of the sleeves may be of the order of 50 mm to 600 mm for the external sleeve and of 5 mm to 100 mm for the internal sleeve.

This relatively simple solution to be applied is however not optimum, since this is a method which takes a long time to apply. For a reactor core sleeve having the aforementioned dimensions, the bonding and the quality control of the bond may take between 5 and 10 weeks—the duration varying according to the inner dimensions of the sleeve and to the desired bonding layer thickness. The quality of the bonding has to be checked very carefully and depends on the applied detection criteria.

SUMMARY OF THE INVENTION

An object of the invention is to provide a method for manufacturing such bi-material sleeves having better productivity and excellent reliability.

For this purpose, a method is provided for manufacturing a bi-material sleeve, consisting of an annular outer sleeve and of an annular inner sleeve bonded to each other, both sleeves being in different materials, characterized in that:
  the bottom pouring and the solidification of the outer sleeve is carried out in a casting space delimited by a casting base, a wall of a first ingot mold positioned on the casting base and by an upwardly moveable outer wall of a second ingot mold, positioned on said base and concentric with the first ingot mold;
  said moveable outer wall is raised from the second ingot mold so as to uncover the skin of the outer sleeve which is solidified thereagainst;
  the bottom pouring and the solidification of the inner sleeve is carried out in a casting space delimited by said skin of the outer sleeve which is solidified beforehand against the moveable outer wall of the second ingot mold and a stationary inner wall of said second ingot mold, the bonding of both sleeves being carried out by diffusion of material between the surfaces of said sleeves which are in contact with each other during solidification;
  and forging and/or machining of the assembly formed by said bonded sleeves are optionally carried out;

Said outer wall of the second ingot mold may be raised when the solidification of the outer sleeve is completed.

It is possible to begin to raise said outer wall of the second ingot mold when the casting of the outer sleeve is completed, but when its solidification is not yet completed.

It is possible to begin to raise said outer wall of the second ingot mold while the casting of the outer sleeve is not yet completed.

The interface between the outer sleeve and the outer wall of the second ingot mold may be lubricated.

It is possible to achieve forced cooling of the inner wall of the second ingot mold.

The outer sleeve may be in carbon steel and the inner sleeve in stainless steel.

A device is also provided for manufacturing a bi-material sleeve consisting of an annular outer sleeve and of a annular inner sleeve bonded to each other, both sleeves being in different materials, characterized in that it includes:
  a bottom pouring base;
  an inlet channel and its outlet channels for the liquid metal intended to form the material of the outer sleeve, made in said base, said outlet channels opening into a first casting space defined by the upper face of the base, an inner wall of a first ingot mold and the outer wall of a second ingot mold;
  an inlet channel and its outlet channel for liquid metal intended to form the material of the inner sleeve, made in said base, said outlet channels opening into a second casting space defined by the upper face of the base, said outer wall of the second ingot mold and the inner wall of the second ingot mold;
  and a raiser for raising said inner wall of the second ingot mold along a vertical direction, allowing the solidified inner surface of the outer sleeve to be uncovered and to be put into contact with the liquid metal intended to form the inner sleeve.

It may include an interiorly cooled mandrel and surrounded by the inner wall of the second ingot mold.

Said ingot molds may include feeders.

The outer wall of the second ingot mold may include a lubricator for lubricating its interface with the metal intended to form the outer sleeve.

A bi-material sleeve is also provided including a annular outer sleeve and of a annular inner sleeve bonded to each other, both sleeves being in different materials, characterized in that it was obtained by the previous method.

The outer sleeve may be in 16MND5 carbon steel and the inner sleeve may be in 304L stainless steel.

The sleeve may be a constituent of a nuclear or petrochemical reactor vessel.

The sleeve may be a constituent of a nuclear reactor pressurizer.

As this will have been understood, the invention aims at successively or almost simultaneously achieving solidification of two hollow ingots, the shapes and compositions of which correspond to those of the two components of the bi-material sleeve which are desirably obtained. The solidification of the outer face of the ingot forming the inner sleeve is directly carried out on the internal face of the ingot forming the outer sleeve or vice versa, and making them bound to each other is carried out by bonding-diffusion or co-solidification of the metals making them up.

BRIEF DESCRIPTION OF THE DRAWINGS

The invention will be better understood upon reading the description which follows, referring to the following appended figures.

DETAILED DESCRIPTION

Figure 1:
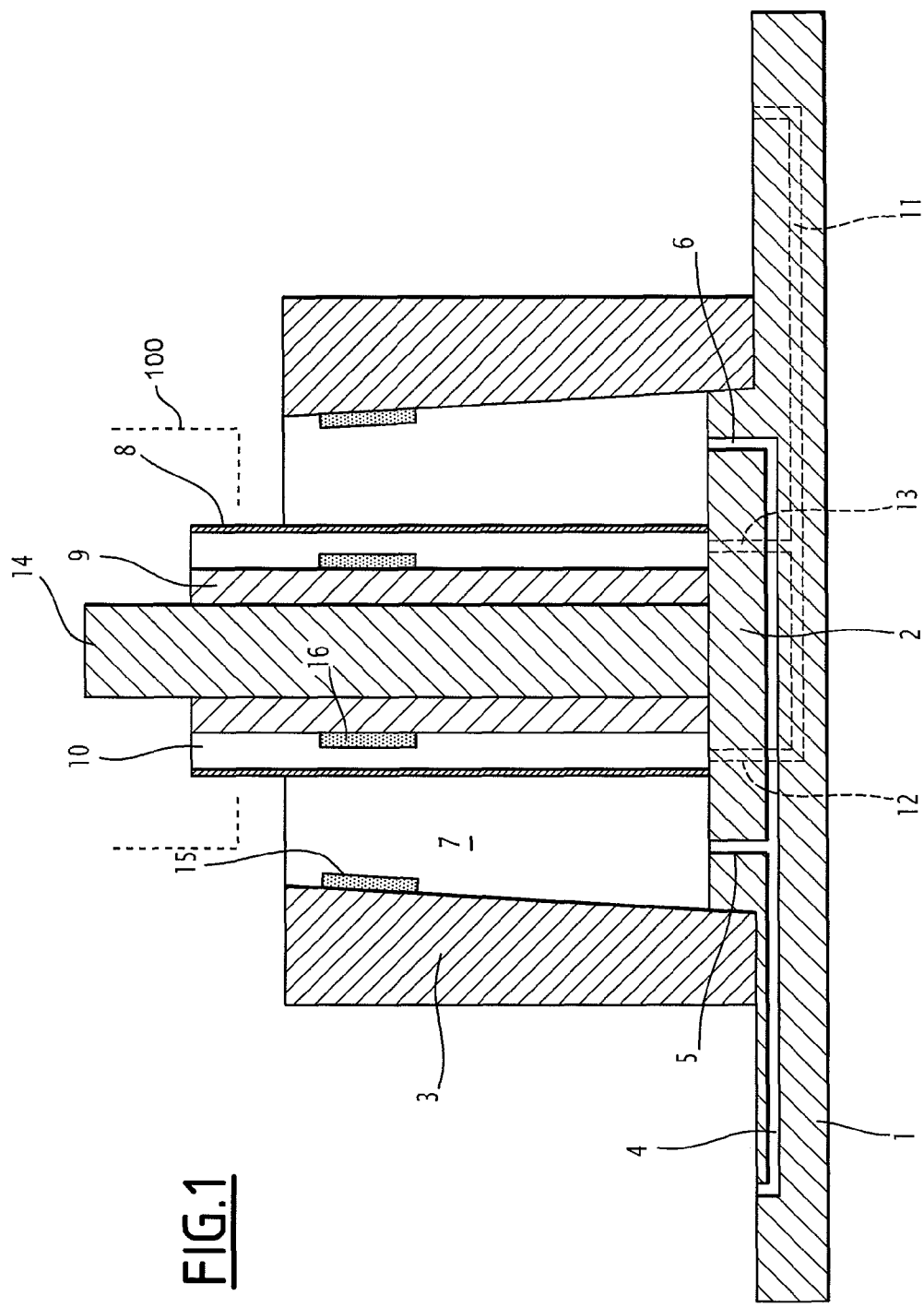
FIG. 1 which schematically illustrates a front sectional view of an installation for applying the method according to the invention.

FIG. 1 represents an exemplary device according to the invention used for the manufacturing of bi-material sleeves. It includes firstly as essential elements a base 1 for bottom pouring of a slightly conical annular ingot in the illustrated example. This base 1, in the illustrated example, includes in its central portion a mount 2 with a substantially cylindrical shape protruding relatively to the remainder of the base 1.

A first ingot mold is partly defined by a metal cylindrical wall 3 deposited on the base 1, and the lower portion of which clasps the mount 2, the upper face of which forms the bottom of the first ingot mold. This wall 3 of the first ingot mold may optionally be cooled exteriorly or interiorly by circulating a fluid, or else be not cooled. The interior face of the first ingot mold 3 has the function of ensuring solidification of the external portion of the sleeve. For this purpose, the base 1 includes an inlet channel 4 for liquid metal (for example a 16MND5 low carbon steel), connected to a trumpet assembly not shown, i.e. to a vertical conduit intended to receive the liquid metal escaping from the bottom of the ladle where its temperature and its composition have been adjusted. The inlet channel 4 is divided into a plurality of outlet channels (including two 5, 6 which are visible in the figures) which open onto the upper face of the mount 2 and allow the liquid metal to reach various locations of the annular casting space 7 exteriorly delimited by the wall 3 of the first ingot mold.

A second ingot mold is defined by the upper face of the mount 2 of the base 1, two other concentric metal cylindrical walls 8, 9 defining together a annular space 10 intended for casting the internal portion of the sleeve. For this purpose, the base 1 includes another inlet channel 11 for liquid metal (for example a 304L austenitic stainless steel), connected to another trumpet assembly (not shown), other than the trumpet assembly feeding the inlet channel 4 mentioned earlier. This other inlet channel 11 is preferably divided into a plurality of outlet channels (including two 12, 13, located at the rear of the sectional plane of the figures, just like the inlet channel 11) which are illustrated in dotted lines in the figures. They open onto the upper surface of the mount 2 and allow the liquid metal to reach the annular casting space 10 defined by the walls 8, 9 of the second ingot mold.

This second ingot mold according to the invention has a particularity which is that its outermost wall 8 which separates both casting spaces 7, 10 (and therefore forms an inner wall for the first ingot mold) is vertically moveable on command, according to methods which will be seen later on. Lifting means not shown, controlled by an operator or an automated device, ensure this mobility. The innermost wall 9 of the second ingot mold is equally stationary or removable.

The installation is completed with a system for cooling the innermost wall 9 defining the second ingot mold. For example, this cooling system may be a mandrel 14 interiorly cooled by circulating a fluid (water for example) as described in documents FR-A-2 525 131, FR-A-2 543 031, FR-A-2 676 670 or FR-A-2 676 671. This mandrel 14 is in contact with the innermost wall 9 defining the second ingot mold in order to ensure its cooling and its support during use of the installation.

The installation is also preferably provided, in the upper portions of the casting spaces 7, 10 with feeders 15, 16 i.e. circumferential parts in refractory material positioned on the stationary walls of the ingot molds:

the internal face of the first ingot mold 3;
and the innermost wall 9 of the second ingot mold.

The role of these feeders 15, 16, the principle of which is well known in the casting of liquid metal ingots, is to delay solidification of the metal in the area located facing them, so that a reserve of liquid metal is formed in this area as long as possible, which may feed the axial portion of the ingot in order to provide it with solidification as homogeneous as possible. Indeed, the solidified skins which form from the opposite walls of an ingot mold may grow irregularly and end up by locally joining together in an anticipated way, thereby forming <<bridges>> which confine still liquid metal. The latter, by solidifying, will reduce in volume and leave empty spaces called <<shrinkage cavities>> which risk being redhibitory for the quality of the ingot and of the products which would stem from it. In the case of sleeves of the type which the invention intends to manufacture, these shrinkage cavities will be all the more bothersome since the sleeves undergo no or very little subsequent plastic deformations which would certainly close the shrinkage cavities. With the liquid metal reserve maintained by the feeder it is possible to feed the central portion of the ingot during solidification and avoid the formation of bridges at the origin of the shrinkage cavities or remold them after their formation.

Figure 2:
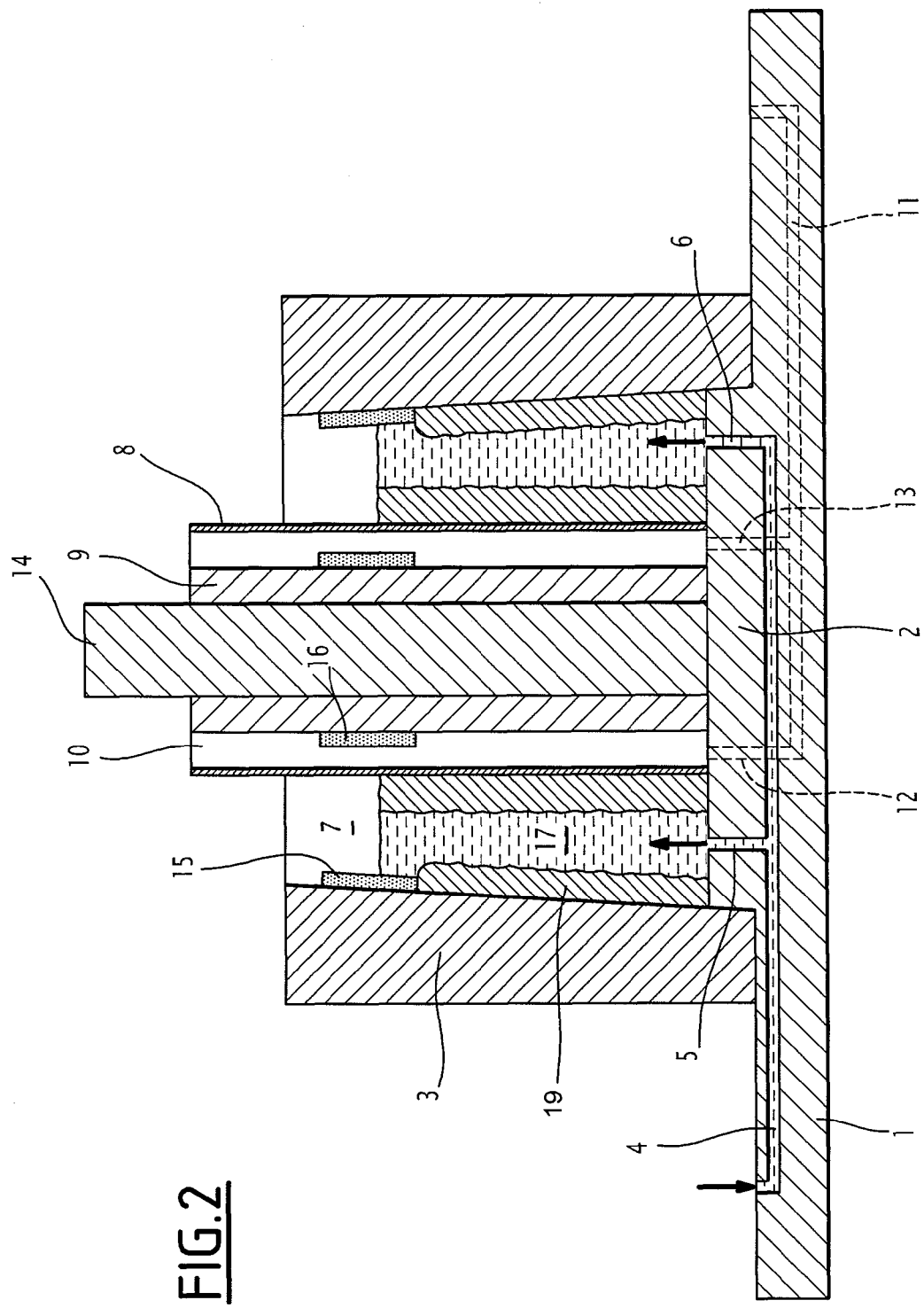
FIG. 2 which illustrates the same installation when the outer sleeve is being solidified.

FIG. 2 illustrates the installation during casting and solidification of the outer sleeves 17 in carbon steel. Carbon steel in the liquid state was introduced into the device, through the inlet channel 4 and it penetrated into the casting space 7 defined by the inner wall of the first ingot mold 3 and the outer wall 8 of the second ingot mold.

In FIG. 2, the sleeve 17 is being solidified and a solidified skin 18 is formed against the walls of the first ingot mold.

Figure 3:
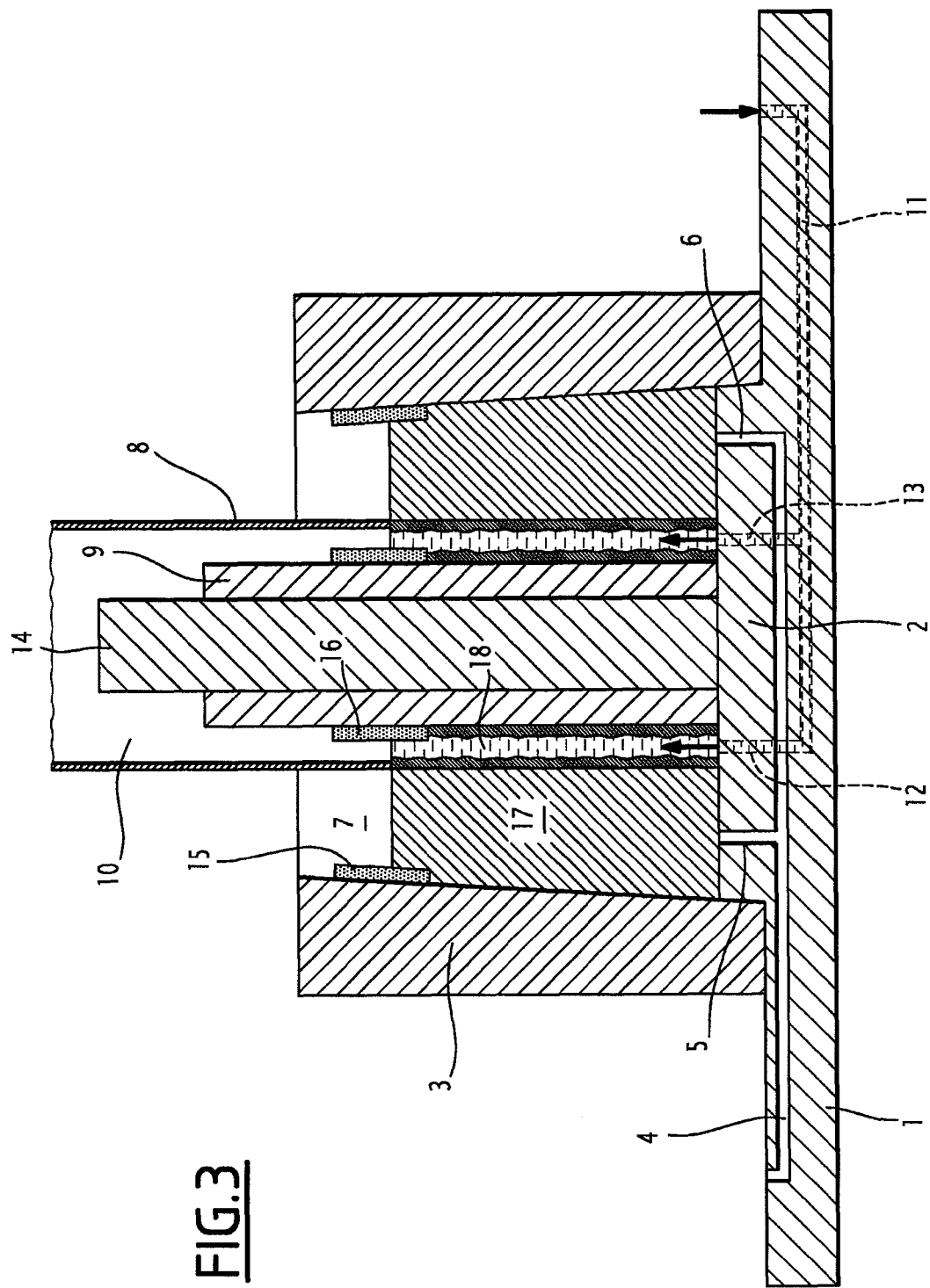
FIG. 3 which illustrates the same installation when the outer sleeve is entirely solidified and the inner sleeve is being solidified.

FIG. 3 illustrates the installation during casting and solidification of the inner stainless steel sleeve. After having raised the cylindrical wall 8 which separated both casting spaces 7, 10 so as to uncover the solidified skin of the outer sleeve 7, stainless steel in the liquid state was introduced through the inlet channel 11. It penetrated into the casting space 10 defined by the outer sleeve 17 and the other wall 9 defining the casting space 10 of the second sleeve. The latter solidifies against the wall 9 cooled by the mandrel 14, and also against the inner surface of the outer sleeve 17. The temperatures of both metals (the solidified sleeve 17 and the liquid metal 18 intended to form the internal annular sleeve) are selected upon casting the inner sleeve so that chemico-metallurgical diffusion between the carbon steel and the stainless steel is significantly effected at their interface, or so that co-solidification occurs at this interface. In this way, excellent quality of the binding together of both sleeves is obtained by a bonding-diffusion or co solidification phenomenon.

After complete solidification of the stainless steel 18, the first ingot mold 3 and the wall 9 of the second ingot mold are removed, and the blank of the desired bi-material sleeve is obtained, ready to be forged and/or machined in order to obtain the definitive sleeve, after also optional heat treatments.

Advantageously, in order to facilitate, by the means of raising 100, the raising of the wall 8 separating both casting spaces 7, 10, without damaging the surface of the sleeve 17, provision may be made so that its face intended to be put into contact with the outer sleeve 17 is equipped with lubrication means such as conduits for injecting oil opening onto the surface of the wall, in a similar way to what is practiced in ingot molds for continuous casting of steel or with conduits for injecting pressurized gas allowing rapid detachment of the wall 8.

A description and illustration was made of the case when one waits, in order to cast the inner stainless steel sleeve, for complete solidification of the outer sleeve 17. But not waiting for this complete solidification and carrying out the raising of the cylindrical wall 8 and then the casting of the stainless steel 18 while the solidification of the outer sleeve 17 would not have been totally completed, remains in accordance with the invention. It would be sufficient that the solidified skin formed on the wall 8 be already sufficiently solid so as not to be damaged by the movement of the wall 8 and to withstand the pressure which the stainless steel 18 would exert on it during its casting. This solution has the advantage of carrying out the casting when the internal surface of the outer sleeve is at a relatively high temperature, which increases the diffusion intensity of metals into each other. The cohesion of both sleeves is thus even better ensured.

In the same way, beginning the raising of the cylindrical wall 8 and the casting of the inner sleeve before the end of the casting of the outer sleeve 17 may be contemplated, when the solidification of the outer sleeve 17 has nevertheless sufficiently progressed so that the skin solidified against the cylindrical wall 8 is sufficiently thick and solid for supporting without any damage the displacement of the wall 8 and the pressure exerted by the injected liquid metal 18 in order to form the inner sleeve. The solidification of the outer sleeve 17 may continue even when the wall 8 is in motion.

The invention, as compared with techniques known up to now, allows suppression of the phase for bonding the stainless steel strip and for checking the bonds, and thus a gain of at least 5 to 10% of the overall time for manufacturing a bi-component sleeve of large size. For example, in a non-limiting way, this may represent 5 to 10 weeks on a manufacturing program which may be spread out over about one hundred weeks.

The manufacturing of a bi-material sleeve requires the elaboration of a bi-component hollow ingot.

The ingot mold with which such a sleeve may be manufactured, is in majority in cast iron, the removable internal device being itself made in cast iron or steel. A circular lamination and/or forging step allows the making of a blank having substantially the final length of a bi-component sleeve, and a minimum blank thickness adapted to the subsequent machining phase. Finally, a machining phase is carried out in order to bring the bi-material sleeve from the blank condition to the condition of a finished part with predefined dimensions.

The invention was described with reference to the manufacturing of bi-material sleeves in carbon steel for the outer portion and in stainless steel for the inner portion. But of course, this example is not limiting and other materials may be used. Also, the orders of magnitude of the dimensions which are mentioned in the example are not limiting.

Within the scope of the invention, the annular sleeve 17, 18 may be cylindrical frusto-conical, with a rectangular or other section.

It is also possible to envision the casting of the inner sleeve 18 before the outer sleeve 17, with the proviso that cooling means are provided which ensure that it is the inner sleeve 18 which forcibly cools first. In the same way as what has been described earlier in the opposite case, the casting of the outer sleeve 17 may be carried out on an inner sleeve 18 which is already partly or totally solidified or further is being cast.

The invention claimed is:

1. A method for manufacturing a bi-material sleeve, the bi-material sleeve including an annular outer sleeve and an annular inner sleeve bonded to each other, the annular outer sleeve being of a different material than the annular inner sleeve, the method comprising:
    bottom pouring and solidifying a first sleeve in a casting space delimited by a casting base, a first ingot mold wall positioned on the casting base and by an upwardly moveable wall positioned on the base and concentric with the first ingot mold wall;
    raising the upwardly moveable wall so as to uncover a skin of the first sleeve which is solidified thereagainst; and
    bottom pouring and solidifying a second sleeve in a casting space delimited by the skin of the first sleeve which has solidified beforehand against the moveable wall and a second stationary ingot mold wall, the bonding of both the first and second sleeves being effected by diffusion of material between the surfaces of the first and second sleeves which are in contact with each other during solidification or by co-solidification.

2. The method as recited in claim 1 further comprising at least one of forging and machining the bi-material sleeve formed by the bonded first and second sleeves.

3. The method as recited in claim 1 wherein the first sleeve is the annular outer sleeve.

4. The method as recited in claim 1 wherein the first sleeve is the annular inner sleeve.

5. The method as recited in claim 1 wherein the upwardly moveable wall is raised when the solidification of the first sleeve is completed.

6. The method as recited in claim 1 wherein the upwardly moveable wall is raised when the casting of the first sleeve is completed, but its solidification is not yet completed.

7. The method as recited in claim 1 wherein the upwardly moveable wall is raised while the casting of the first sleeve is not yet completed.

8. The method as recited in claim 1 wherein an interface between the first sleeve and the moveable wall is lubricated.

9. The method as recited in claim 1 wherein pressurized gas is blown at an interface between the first sleeve and the moveable wall.

10. The method as recited in claim 1 wherein forced cooling is carried out on at least one of the walls of the ingot mold.

11. The method as recited in claim 1 wherein the outer sleeve is carbon steel and the inner sleeve is stainless steel.

12. The method as recited in claim 1 wherein the bi-material sleeve consists of the annular outer sleeve and the annular inner sleeve bonded to each other.

13. A bi-material sleeve including:
    an annular outer sleeve; and
    an annular inner sleeve, the annular outer sleeve and the annular inner sleeve bonded to each other, the annular outer sleeve and the annular inner sleeve being of different materials, the bi-material sleeve being made by the method as recited in claim 1.

14. The sleeve as recited in claim 12 wherein the outer sleeve is 16MND5 carbon steel and the inner sleeve is 304L stainless steel.

15. The sleeve as recited in claim 12 wherein the sleeve consists of the annular outer sleeve and the annular inner sleeve bonded to each other.

16. A nuclear or petrochemical reactor vessel comprising: the sleeve recited in claim 12.

17. A nuclear reactor pressurizer comprising: the sleeve recited in claim 12.

18. A device for manufacturing a bi-material sleeve including an annular outer sleeve and an annular inner sleeve bonded to each other, the annular outer sleeve being of a different material than the annular inner sleeve, the device comprising:
   a bottom casting base, a first inlet channel and its first outlet channels formed in the bottom casting base for liquid metal intended to form a material of the outer sleeve, a second inlet channel and its second outlet channels formed in the bottom casting base for a liquid metal intended to form a material of the inner sleeve;
   a first ingot mold including an inner wall;
   a second ingot mold including an inner wall and an outer wall, the first outlet channels opening into a first casting space defined by an upper face of the bottom casting base, the inner wall of a first ingot mold and the outer wall of a second ingot mold, the second outlet channels opening into a second casting space defined by the upper face of the bottom casting base, the outer wall of the second ingot mold and the inner wall of the second ingot mold; and
   a raiser for raising the outer wall of the second ingot mold along a vertical direction, giving the possibility of uncovering a solidified inner surface of the outer sleeve and of putting it into contact with the liquid metal intended to form the inner sleeve.

19. The device as recited in claim 18 further comprising a cooler for cooling the inner wall of the second ingot mold, the cooler including a mandrel interiorly cooled and surrounded by the inner wall of the second ingot mold.

20. The device as recited in claim 18 wherein the first and second ingot molds each include a feeder.

21. The device as recited in claim 18 wherein the outer wall of the second ingot mold includes a lubricator for lubricating an interface of the outer wall with the metal intended to form the outer sleeve.

22. The device as recited in claim 18 wherein the outer wall of the second ingot mold includes a blower for blowing pressurized gas at its interface with the metal intended to form the outer sleeve.

23. The device as recited in claim 18 wherein the bi-material sleeve consists of the annular outer sleeve and the annular inner sleeve bonded to each other.

\* \* \* \* \*